United States Patent [19]

Schwenzfeier

[11] E Re. 29,507

[45] Reissued Jan. 3, 1978

[54] APPARATUS FOR FORMING SELF LOCKING FASTENERS

[75] Inventor: Otto Kurt Schwenzfeier, Chula Vista, Calif.

[73] Assignee: Long-Lok Fasteners Corporation, Cincinnati, Ohio

[21] Appl. No.: 392,611

[22] Filed: Aug. 29, 1973

Related U.S. Patent Documents

Reissue of:

[64] Patent No.: 3,726,740
Issued: Apr. 10, 1973
Appl. No.: 141,654
Filed: May 10, 1971

[51] Int. Cl.[2] ..... B32B 31/00

[52] U.S. Cl. ..... 156/498; 156/322; 156/499; 156/500; 156/521; 156/557

[58] Field of Search ..... 156/293, 294, 363, 500, 156/557, 513–514, 515, 516, 517, 518–521, 498–499; 425/109, 297, 298, 299, 305, 404; 151/7; 264/248, 249; 83/226, 227, 228, 566–568, 151–152, 239, 459, 515, 518

[56] References Cited

U.S. PATENT DOCUMENTS

| | | | |
|---|---|---|---|
| 2,119,063 | 6/1938 | Van Kempen | 156/520 X |
| 2,394,346 | 2/1946 | Wiedman | 83/568 X |
| 2,801,949 | 8/1957 | Bateman | 156/322 X |
| 3,028,795 | 4/1962 | Hughes | 156/514 X |
| 3,074,608 | 1/1963 | Ohme | 83/227 X |
| 3,266,968 | 8/1966 | Gunten | 156/368 |
| 3,319,499 | 5/1967 | Hawkes et al. | 156/518 |
| 3,324,919 | 6/1967 | Brightman et al. | 151/7 |
| 3,367,261 | 2/1968 | Kashiwagi | 156/498 |
| 3,417,427 | 12/1968 | Kull | 425/109 |
| 3,457,815 | 7/1969 | Cahill | 156/513 X |
| 3,458,896 | 8/1969 | Zetterlund et al. | 425/109 |
| 3,523,052 | 8/1970 | Bolen | 156/521 |
| 3,557,293 | 5/1971 | Ritterhoff | 156/363 |
| 3,649,413 | 3/1972 | Way | 156/518 |
| 3,654,024 | 4/1972 | Heinricy | 156/363 |
| 3,657,405 | 4/1972 | Langecker | 156/518 X |
| 3,681,160 | 8/1972 | Richie et al. | 156/521 X |

FOREIGN PATENT DOCUMENTS

| | | | |
|---|---|---|---|
| 1,553,575 | 1/1969 | France. | |
| 1,223,131 | 2/1971 | United Kingdom. | |
| 1,235,681 | 6/1971 | United Kingdom | 151/7 |

*Primary Examiner*—David A. Simmons
*Attorney, Agent, or Firm*—George F. Smyth

[57] ABSTRACT

For the production of screw fasteners with plastic patches thereon, the fasteners are preheated to a high temperature. Each heated fastener pauses at a processing station where a predetermined increment of a plastic strip is severed and dropped onto the hot fastener and as the plastic melts a pressure shoe forms the plastic to the curved cross-sectional configuration of the fastener. The fasteners are then quenched. For high production a number of the fasteners are processed simultaneously on each of the repeated cycles of operation. The apparatus is readily adjustable to handle fasteners of different sizes.

35 Claims, 14 Drawing Figures

INVENTOR:
Otto Kurt Schwenzfeier
By Smyth, Lostow & Pavitt
ATTORNEYS

Fig. 2
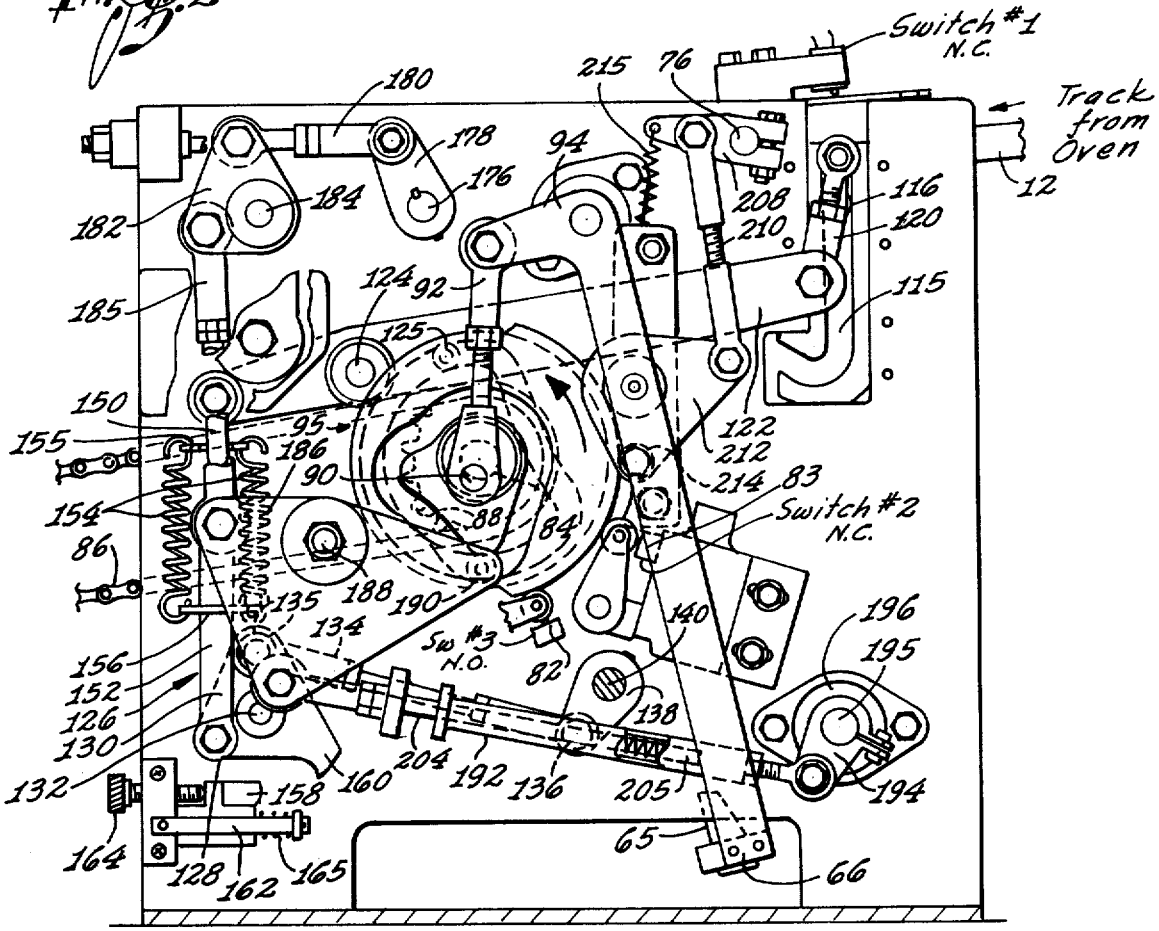
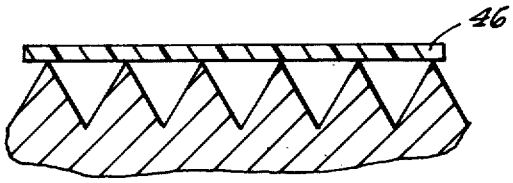
Fig. 5
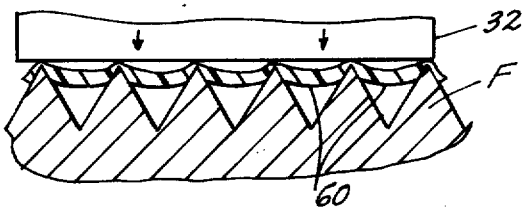
Fig. 6
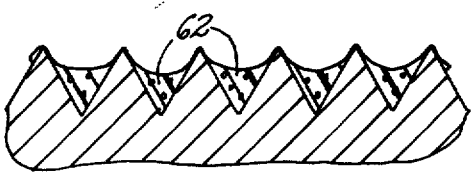
Fig. 7
INVENTOR:
Otto Kurt Schwenzfeier
By Smyth, Roston & Pavitt
ATTORNEYS INVENTOR:
Otto Kurt Schwenzfeier
By Smyth, Roston & Pavitt
ATTORNEYS INVENTOR:
Otto Kurt Schwenzfeier
By Smyth, Roston & Pavitt
ATTORNEYS INVENTOR:
Otto Kurt Schwenzfeier
By Smyth, Roston & Pavitt
ATTORNEYS INVENTOR:
Otto Kurt Schwenzfeier By Smyth, Roston & Pavitt

ATTORNEYS

APPARATUS FOR FORMING SELF LOCKING FASTENERS

Matter enclosed in heavy brackets [ ] appears in the original patent but forms no part of this reissue specification; matter printed in italics indicates the additions made by reissue.

BACKGROUND OF THE INVENTION

The invention relates to that type of a screw fastener which is provided with a plastic patch for self-locking operation. Fasteners of this general type are disclosed for example in Villo Pat. 3,093,177 and Preziosi Pat. 3,294,139.

The present disclosure is particularly directed to the forming of a plastic patch on a fastener wherein the plastic material is of a character that makes an effective bond with the fastener if the fastener is preheated to a [temperatuer] *temperature* high enough to melt an increment of plastic thereon. The molten plastic is shaped to the fastener and then the fastener is quenched to give the plastic the desired self-locking characteristic.

Employing plastic material of this capability makes it unnecessary to use a priming agent or any other expedient to cause the plastic to bond tenaciously to the fastener. This fact helps make possible the primary object of the invention which is to produce patch-type self-locking fasteners at a high production rate to make possible exceptionally low unit cost.

SUMMARY OF THE INVENTION

For high production a plurality of fasteners is processed on each cycle of the apparatus and in the initial embodiment of the invention eight fasteners are processed simultaneously.

A conventional feeding mechanism advances eight rows of the fasteners through an oven to eight corresponding receiving stations of the apparatus where eight fasteners are released simultaneously to gravitate down eight guides to come to rest against corresponding stop means at eight processing stations. The eight fasteners are then clamped in position while eight patch-applying assemblies advance against the immobilized fasteners.

Each advancing patch-applying assembly incorporates an adjustable metering mechanism which measures out a predetermined increment of a plastic strip. With continued advance of the patch-applying assembly, the increment of plastic strip is severed to drop onto the heated fastener. In the final stage of the advance of the assembly a pressure head of the assembly shapes the melted plastic to the cross-sectional curvature of the fastener. The fasteners are then released from the processing station for discharge into a quenching bath. The absence of a fastener at any one of the eight receiving stations at the start of an operating cycle automatically prevents operation during the cycle of the increment-advancing mechanism of the corresponding plastic-applying assembly.

Spring-pressed yielding operating connections preclude any damage by jamming of the working parts of the apparatus. Various provisions including the use of adjustable stop means at the eight processing stations makes it possible to change over the apparatus quickly from a run of fasteners of one size to a run of another size.

BRIEF DESCRIPTION OF THE DRAWINGS

FIG. 2 is a side elevational view as seen along the line 2—2 of FIG. 1 and line 2—2 of FIG. 4 with the side wall of the housing removed to reveal the working parts;

FIG. 5 is an enlarged fragmentary sectional view showing how a strip of plastic is initially deposited on the screw thread of the heated fastener;

FIG. 6 is a similar view showing how a pressure shoe advances to form the plastomeric material to the cross-sectional configuration of the fastener and to cooperate wih the crests of the screw thread to cut the plastic strip into discrete sections;

FIG. 7 is a similar view showing how the discrete plastic sections melt into the valleys of the screw thread;

DESCRIPTION OF THE PREFERRED EMBODIMENT OF THE INVENTION

General arrangement

Figure 1:
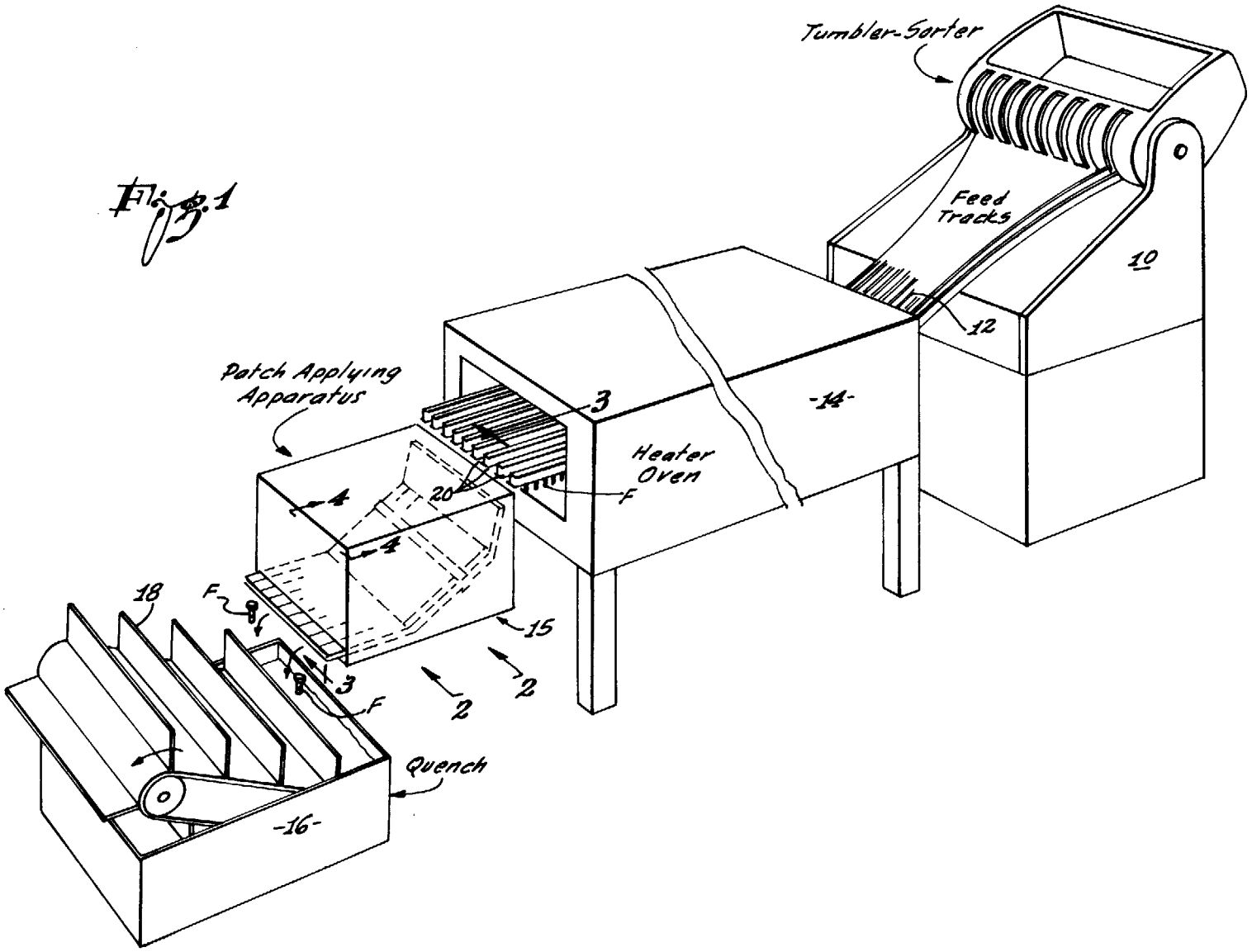
FIG. 1 is a perspective view of the presently preferred embodiment of the invention.

FIG. 1 shows a conventional sorting apparatus 10 which feeds the screw fasteners to eight tracks 12 which extend through an oven 14 to the eight receiving stations of an apparatus generally designated 15 which embodies the present invention. The apparatus 15 discharges the fasteners with the plastic patches thereon into a quenching tank 16 which is provided with a conveyor 18 for delivering the finished product.

Each of the eight tracks 12 forms a longitudinal slot 20 which is narrower than the head of a fastener F but wider than the shank of the fastener so that the shanks of the fasteners hang downward from the tracks. With the tracks 12 slightly inclined downward towards the apparatus 15 and with the tracks subject to continuous vibration, the eight rows of the fasteners advance simultaneously to the apparatus 15.

Figure 3:
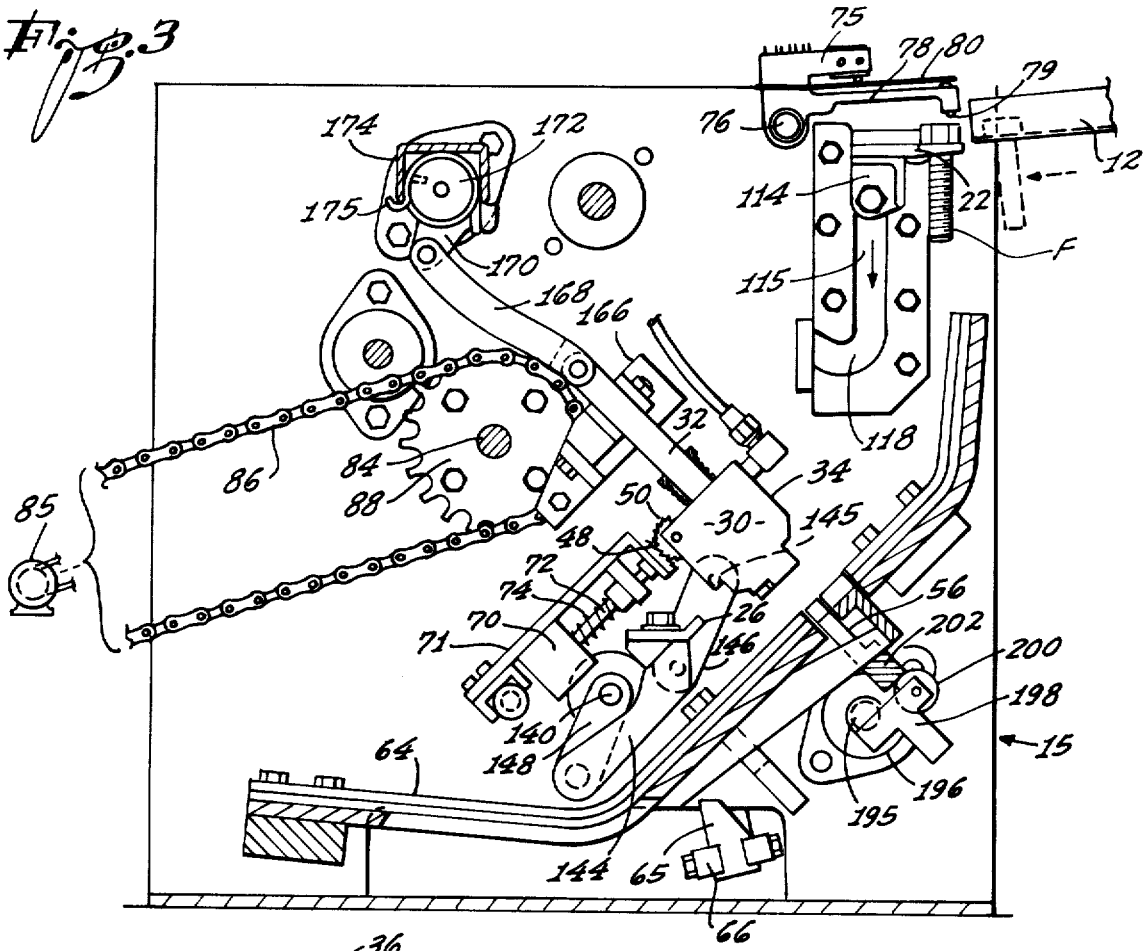
FIG. 3 is a vertical longitudinal sectional view as seen along the line 3—3 of FIG. 1 and along the line 3—3 of FIG. 4.
Figure 9:
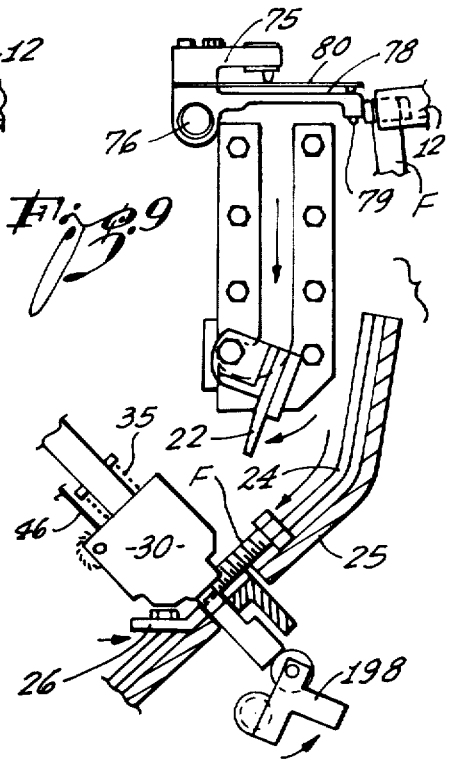
FIG. 9 is a similar view showing how the holding fork releases the fastener to slide down a ramp to a stop at the processing station.
Figure 11:
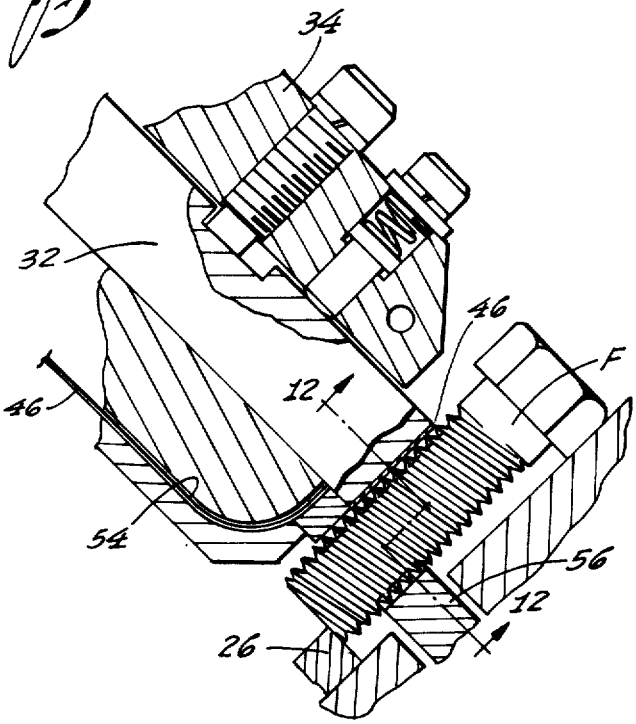
FIG. 11 is a similar view of the patch-applying assembly at its point of maximum advance where the pressure shoe of the assembly presses against the fastener.

As indicated in FIG. 3 each of the eight receiving stations of the apparatus 15 has a holder in the form of a receiving fork 22 which receives a fastener F from the corresponding track 12 and, as shown in FIG. 9, each of the eight receiving forks 22 discharges the corresponding fastener onto a guide groove 24 of a ramp 25 and the fastener in reclining position comes to rest against a stop bar 26 that extends across the eight processing stations. While a fastener F pauses at a processing station, a corresponding patch-applying assembly generally designated 30, advances to the fastener.

Figure 10:
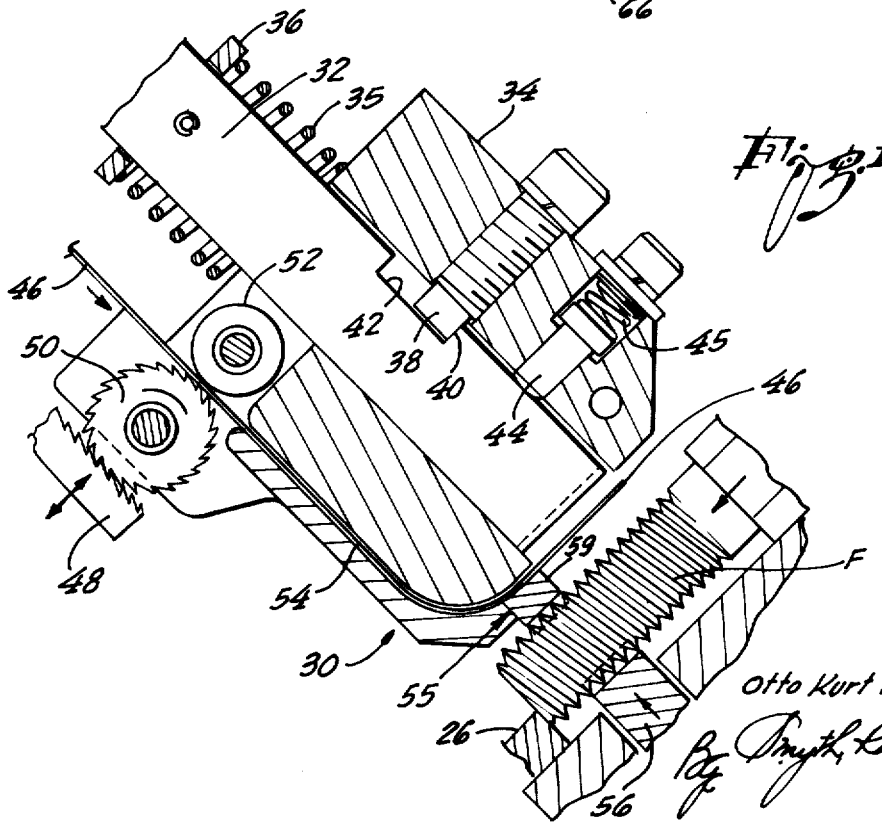
FIG. 10 is an enlarged fragmentary sectional view of the patch-applying assembly at the point of advance of the assembly at which it makes initial contact with a fastener at the processing station.

As best shown in FIG. 10, the patch-applying assembly 30 comprises essentially a reciprocating plunger 32 with a water-cooled head 34 slidingly mounted on the leading end of the plunger. A coiled spring 35 acts in compression between a collar 36 on the plunger and the head 34 to urge the head to a forward limit position shown in FIG. 10 at which a stud 38 carried by the head abuts a forward stop shoulder 40 of a recess 42 in the plunger. Preferably the head 34 carries a pin 44 under pressure to force the plunger against the opposite face of the housing to facilitate the cutting of the plastic film by maintaining a closer tolerance with the shearing edge 59.

As the patch-applying assembly 30 advances towards the reclining fastener F, a suitable metering apparatus functions to advance an increment of a plastic strip 46 into position for application to the fastener in the manner indicated in FIG. 10. In this particular embodiment of the invention, the metering mechanism includes a normally stationary rack 48 adjacent the path of advance of the patch-applying assembly and a pinion 50 on the head 34 of the assembly that engages the rack and rotates in response to the advance of the assembly 34. The pinion 50 cooperates with a pressure roller 52 to advance the plastic strip from a corresponding feed roll (not shown) through a guide slot 54 that curves to direct the measured increment into the region between the fastener F and the leading end of the plunger 32.

The nose of the head 34 is provided with an upper clamp means generally designated 55, which cooperates with a lower clamp means 56 under the reclining fastener to immobilize the fastener during the patch-applying operation. As may be seen in FIG. 12, the upper clamp means 55 comprises a pair of clamp elements 58 which cooperate with the lower clamp means 56 to provide a 3-point grip on the fastener. After the head 34 makes initial contact with a reclining fastener as shown in FIG. 10, the plunger 32 continues to advance with consequent compression of the coil spring 35 and the leading end of the plunger cooperates with a shearing edge 59 of the head 34 to sever the advanced increment of the plastic strip 46.

Figure 12:
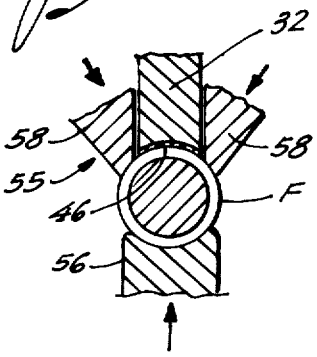
FIG. 12 is a fragmentary sectional view along the angular line 12—12 of FIG. 11 showing how the fastener is clamped at three points when the pressure shoe advances against the fastener.

The severed increment of the plastic strip 46 is carried downwardly by the leading end of the plunger onto the screw thread of the fastener F in the manner shown in FIG. 5. As the severed plastic strip begins to soften under the heat from the fastener, the leading end of the plunger 32 continues to advance to function as a pressure shoe. The pressure shoe causes initial contact of the strip with the crests of the threads as shown in FIG. 6 and at the same time the pressure head shapes the softened plastic to the cross-sectional curvature of the fastener as shown in FIG. 12. In a short period of time after release of the bolt F the plastic strip 46 melts into the valleys of the screw thread to form plastic pools 62 in the valleys as indicated in FIG. 7.

After the plastic material is applied to the eight fasteners in the manner described, the eight patch-applying assemblies 30 retract upward to permit the springs 35 to return the plungers 32 to their normal positions shown in FIG. 10. At the same time the lower clamps 56 at the eight processing stations retract downwardly out of the way and the stop bar 26 which is common to all eight processing stations retracts upwardly out of the way to free the eight fasteners F for gravitational movement down the ramp 25 to a terminal portion 64 of the ramp (FIG. 3). Immediately thereafter eight pusher fingers 65 on a pusher yoke 66 advance into corresponding slots 68 of the terminal portion of the ramp 25 to push the fasteners into the quenching tank 16.

A feature of the invention is the provision of means to prevent operation of any one of the eight strip-metering mechanisms in the absence of a fastener at the corresponding processing station. For this purpose means is provided to sense the absence of fasteners on the receiving forks 22 at the receiving stations of the apparatus and eight corresponding solenoids 70 function to retract the corresponding racks 48 out of the path of the corresponding pinions 50 to prevent actuation of the pinions. As shown in FIG. 3, each rack 48 is on the outer end of the armature 72 of the corresponding solenoid 70 and is normally held in its effective position by a coil spring 74 on the armature.

Figure 4:
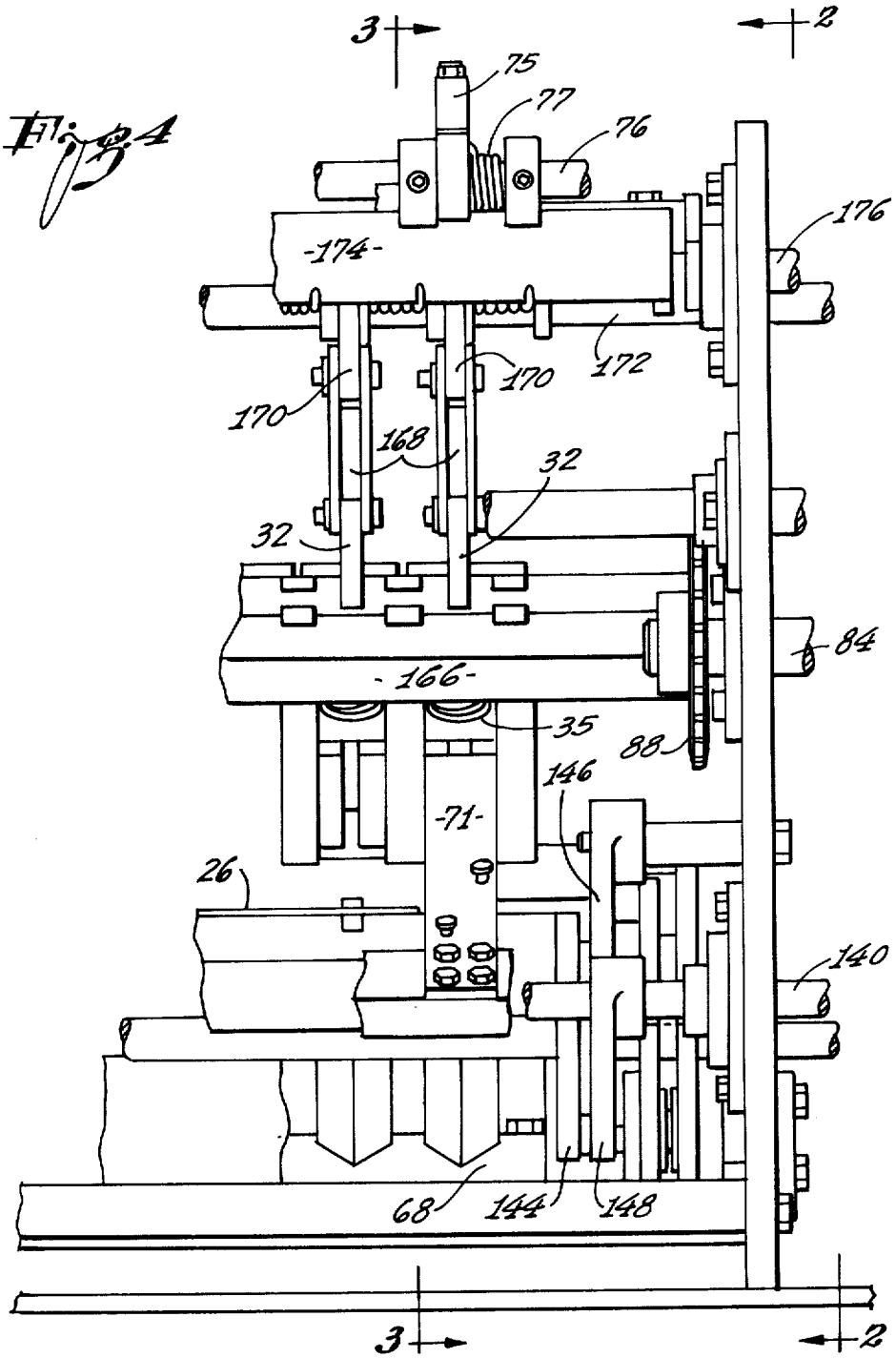
FIG. 4 is a front elevational view of the working parts of the apparatus as seen along the line 4—4 of FIG. 1.
Figure 8:
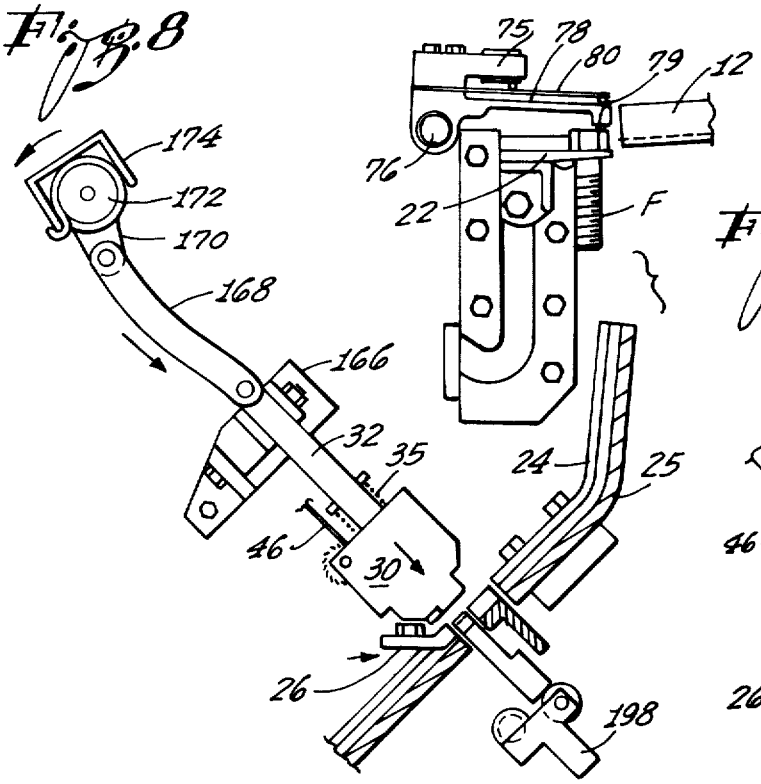
FIG. 8 is a fragmentary elevational view of working parts showing how a screw fastener is received by a holding fork at one of the eight receiving stations of the apparatus.

As shown in FIG. 3 a sensing switch 75 is positioned at each of the receiving stations and the eight sensing switches are mounted on a rocker shaft 76. As shown in FIG. 4, each sensing switch 75 is operatively connected to the rocker shaft 76 by a corresponding torsion spring 77. United with each sensing switch 75 is a rigid finger 78 and each sensing switch includes a sensing pin 79 which is slidingly mounted in the finger and backs against a leaf spring arm 80 of the sensing switch. All of the sensing switches 75 are normally closed but each sensing switch opens if its sensing pin 79 contacts the head of a fastener F in the manner shown in FIG. 8. In the absence of a fastener at a receiving station at the beginning of an operating cycle, the corresponding sensing switch 75 remains closed to cause energization of the corresponding solenoid 70 throughout the remainder of the operating cycle. Two cam actuated switches 82 and 83 which are shown in FIG. 2 cooperate with the eight sensing switches 75 in a manner that will be described later.

Referring to FIGS. 3 and 4 each cycle of operation of the apparatus is carried out by one revolution of a continuously rotating drive shaft 84 which is actuated by a suitable motor 85 which is shown diagrammatically in FIG. 3, the motor being connected by a sprocket chain 86 with a sprocket 88 on the shaft. As indicated in FIG. 2, the opposite ends of the shaft 84 are provided with cranks 90 which are connected by links 92 to the short arms of corresponding bell cranks 94. The previously mentioned pusher yoke 66 is carried by the longer arms of the two bell cranks 94.

Figure 13:
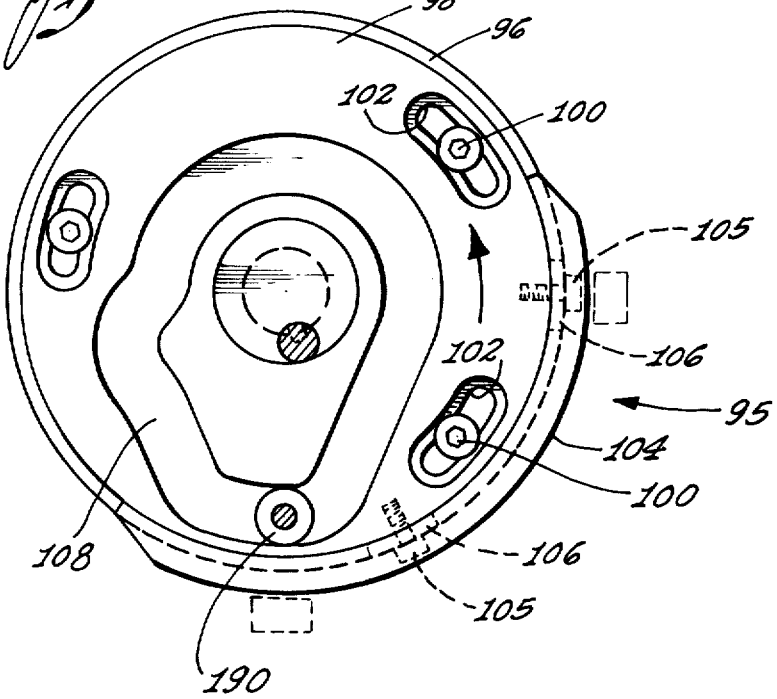
FIG. 13 is a face view of a cam assembly of the apparatus.

Mounted on the shaft 84 is a cam assembly designated 95 in FIG. 2 which, as shown in FIG. 13, includes two cam discs 96 and 98 which are positioned back to back and are adjustably interconnected by bolts 100 which extend from the cam disc 96 through corresponding arcuate slots 102 in the cam disc 98. The cam assembly 95 further includes a peripheral cam shoe 104 which is anchored to the cam disc 98 by radial screws 105 which extend through short slots 106 of the cam shoe to permit adjustment of the angular relationship between the cam shoe and the cam disc 98. The cam shoe rocks the sensing switches 75 and also closes the normally open switch 83.

The outer face of the cam disc 98 is formed with a continuous cam groove 108 for the purpose of actuating the various patch-applying assemblies 30 and the various lower clamp means 56 at the processing stations. The inner face of the cam disc 96 is formed with a continuous cam groove 110 that controls the stop bar 26 and also controls the eight receiving forks 22 at the eight receiving stations of the apparatus. The cam disc 96 is further formed with a peripheral lobe 112 which briefly closes the normally open switch 82 early in the operating cycle.

Structural details

Figure 14:
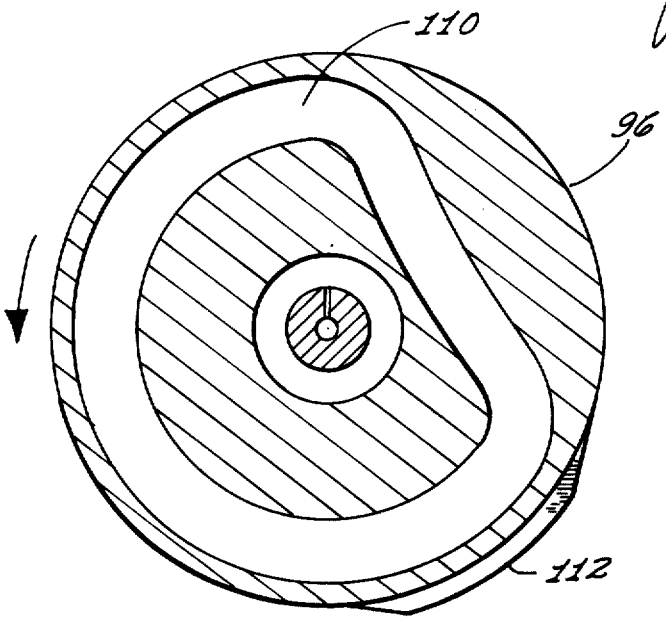
FIG. 14 is a sectional view of a cam disk that is concealed in FIG. 13.

The eight receiving forks 22 at the respective receiving stations are mounted on a carriage 114 that traverses a guide slot 115. The carriage 114 has two spaced rollers in engagement with the guide slot, one of which rollers is indicated at 116 in FIG. 2. The lower end of the guide slot 115 is formed with a curve 118 which rocks the carriage 114 to cause all of the receiving forks 22 to tilt downward to release the fasteners thereon as shown in FIG. 9. As indicated in FIG. 2 the carriage 114 is actuated by a link 120 at the end of the long arm of a lever 122 that is mounted on a fixed pivot 124. The lever 122 is controlled by a roller 125 on one side of the lever which rides in the previously mentioned cam groove 110 (FIG. 14) of a cam disc 96.

The stop bar 26 that determines the positions of the fasteners at the eight processing stations is controlled by the shorter arm of the lever 122 and for this purpose the shorter arm is connected by a link 126 to a pivot 128 on a rocker plate 130 that is mounted on a fixed pivot 132. A link 134 connected to a pivot 135 on the triangular plate is connected by a pivot 136 to a rocker arm 138 on a rocker shaft 140.

As indicated in FIGS. 3 and 4, the stop bar 26 is fixedly mounted at each of its ends on a link 144, one end of which is connected to a fixed pivot 145 by a link 146. The other end of the link 144 is connected to a rocker arm 148 on the rocker shaft 140. Each rocker arm 148 and the corresponding link 146 are substantially parallel as may be seen in FIG. 3 to cause the stop bar 26 to follow a desired path between the retracted position of the stop bar shown in FIG. 3 and the effective position of the stop bar indicated in FIGS. 8 and 9.

It is to be noted that the link 126 acts in tension to move the stop bar 26 to its effective position and is constructed for resilient expansion in length. In the construction shown in FIG. 2 the link 126 is of telescoped construction with an inner rod 150 telescoped into an outer tube 152. The inner rod 150 of link 126 is connected to the short arm of the lever 122 and the outer tube 152 of the link is connected to the rocker plate 130. A pair of springs 154 act in tension between a collar 155 on the inner rod and a collar 156 on the outer tube 152. By virtue of this construction the link 126 acts in tension to rotate the rocker plate 130 clockwise as viewed in FIG. 2 but if any obstacle interferes with rotation of the triangular plate, the link simply expands in length in opposition to the two springs 154.

The particular position at which the stop bar 26 comes to rest at the processing stations is determined by a stop block 158 which is in the path of rotation of a finger portion 160 of the rocker plate 130. The stop block 158 is slidingly mounted on suitable guide means 162 and is retracted against a thumb screw 164 by a compression spring 165. When the rocker plate 130 is rotated clockwise by the link 126, the finger portion 160 rotates against the stop block 158 and thereafter the link 126 expands in length without further actuation of the stop bar 26. Thus, the thumb screw 164 may be manipulated to adjust the effective position of the stop bar 126 in accord with whatever size fastener is being processed by the apparatus.

As shown in FIGS. 3 and 4 the eight plungers 32 of the eight patch-applying assemblies 30 are slidingly mounted in fixed guide means 166 and are operatively connected by links 168 to corresponding rocker arms 170 that are free to rotate on a transverse shaft 172. An inverted channel iron 174 straddles the shaft 172 and rocks about the axis of the shaft. Each of the rocker arms 170 is yieldingly connected to the channel iron 174 by a corresponding torsion spring 175 which normally holds the rocker arm in fixed angular relation to the shaft but which yields in the event that some obstacle in the path of the patch-applying assembly 30 interrupts the advance of the patch-applying assembly towards the processing station. The channel iron 174 is fixedly connected to a stub shaft 176 shown in FIGS. 2 and 4 which rotates on the same axis as the channel iron and which is actuated by a rocker arm 178 that is shown in FIG. 2. The rocker arm 178 is operatively connected by a link 180 to a rocker plate 182 that is mounted on a fixed pivot 184 and the rocker plate 182, in turn, is connected by a link 185 to a rocker plate 186 that is mounted on a fixed pivot 188. The rocker plate 186 carries a roller 190 which, as indicated in FIG. 13, rides in the continuous cam groove 108 of the cam disc 98. Each revolution of the drive shaft 84 on which the cam disc 98 is mounted causes oscillation of the inverted channel iron 174 to advance and retract the eight patch-applying assemblies 30 in a yielding manner.

The rocker plate 186 is also connected by a link 192 to a rocker arm 194 on a shaft 195 that is mounted in suitable bearings 196. As shown in FIG. 3, the rocker shaft 195 carries a rocker arm 198 with a roller 200 on the rocker arm in operating abutment with a transverse bar 202 which is integral with the eight slidingly mounted lower clamp means 56.

The link 192 that actuates the rocker shaft 195 is resiliently contractable in length and for this purpose comprises a rod 204 that is pivotally connected to the rocker plate 186 and a tubular member 205 in which the rod is telescoped, the tubular member being pivotally connected to the rocker arm 194. A suitable coil spring (not shown) inside the tubular member 205 acts in compression between the members 204 and 205 to keep the link extended in a resilient manner. If any obstacle prevents normal advance of any of the lower clamp means 56 the link 192 resiliently contracts. The positions to which the lower clamp means 56 are advanced by oscillation of the rocker arm 194 may be varied by adjusting the angular position of the rocker arm on the shaft 195 and for this purpose the rocker arm is of split adjustable construction as indicated in FIG. 2.

As shown in FIG. 3, the eight sensing switches 75 are mounted on a rocker shaft 76 and as shown in FIG. 4 each sensing switch is yieldingly connected to the shaft by a corresponding torsion spring 77. As indicated in FIG. 2 the rocker shaft 76 carries a rocker arm 208 which is connected by a link 210 to a rocker plate 212 which carries a roller 214 for actuation by the previously mentioned cam shoe 104 of the cam assembly 95. A suitable tension spring 215 acting on the rocker arm 208 is effective to continuously urge the roller 214 against the cam shoe.

Normally all eight of the receiving forks 22 are occupied by corresponding fasteners so that when the rocker shaft 76 tilts the eight sensing switches 75 downward each of the switches is opened by contact with the corresponding fastener F at the receiving forks 22, however, the corresponding sensing switch 75 remains closed.

When the receiving forks shift downward to release their fasteners, the fingers 78 of the sensing switches block the exit of fasteners from the tracks 12 as shown in FIG. 9 until the receiving forks return to their normal positions.

The eight solenoids 70 are respectively connected to the sensing switches 75 and the sensing switches are connected in parallel to the previously mentioned normally open switch 82. Thus switch 82 is in series with each of the sensing switches so that switch 82 must be closed to make the solenoids responsive to the sensing switches. Switch 82 is closed briefly early in each operating cycle by the previously mentioned relatively short lobe 112 of the cam disc 96 so that the sensing switches can energize the corresponding solenoids only during a brief period early in the operating cycle when the sensing switches probe downward to sense the presence or absence of fasteners on the corresponding receiving forks 22. Whenever a particular solenoid 70 is energized by the combined action of the switch 82 and the corresponding sensing switch 75, a corresponding holding circuit is closed to keep the solenoid energized independently of the corresponding sensing switch 75 and the switch 82. All of the eight holding circuits for the eight solenoids are connected in parallel to the normally open switch 83 so that all of the holding circuits may be opened by opening of the switch 83. The normally open switch 83 is controlled by the operating shoe 104 of the cam assembly 95 and is held closed during the period in which the pinions 50 normally cooperate with the corresponding eight racks 48 to advance increments of the plastic tape. Thus if any of the eight solenoids 70 is energized while the switch 82 is momentarily closed, the solenoid will remain energized to prevent actuation of the corresponding pinion 50 until the holding switch 83 opens later in the operating cycle.

My description in specific detail of the presently preferred embodiment of the invention will suggest various changes, substitutions and other departures from my disclosure within the spirit and scope of the appended claims.

I claim:

1. [In an apparatus for forming a plastic patch on a workpiece having a curved cross-section configuration, for example, on the screw thread of a fastener, the combination of:

means to place a workpiece in preselected position at a processing station;

means to advance an increment of plastic strip to a position above the workpiece;

means to shear off a fragment from the increment and to carry the fragment to the workpiece, and means having a curved working face shaped to a curvature that is substantially complementary to the curvature of the workpiece to press the sheared fragment of plastic strip against the curved surface of the workpiece for adherence thereto.] *An apparatus for forming a plastic patch on a workpiece which is an externally threaded fastener to provide the fastener with self-locking characteristics by reason of a patch of plastic adhered to a plurality of unmodified threads of the fastener comprising:*

*means for heating the threaded fastener to an elevated temperature sufficient to convert the plastic patch to a completely molten state when the patch is brought into contact with the heated fastener;*

*means to place the heated fastener in a preselected position at a processing station;*

*means to advance an increment of plastic strip to a position adjacent the heated fastener;*

*means for cutting a fragment from the increment and to carry the fragment to the heated fastener;*

*means having a smooth working face which is shaped to a curvature that is substantially complementary to the curvature of the threaded fastener to press the fragment of plastic strip about the fastener and into engagement with the crests of the threads of the heated fastener, and*

*means to yieldingly move said means having a smooth working face against said heated fastener with a force which applied a work shaping pressure to the fragment that is sufficient to hold the fragment engaged with the crests of the threads of the heated fastener without pressurally forcing material of the fragment into the valleys of the threads for a time sufficient for the heated crests of the fastener to sever the fragment into discrete segments which in a completely molten state flow downwardly of the crests and into the valleys between adjacent crests of the threads to adhere to adjacent flanks of the threads in forming a unitary plastic patch on the threads in which accurately predetermined quantities of the plastic are present in each of the discrete severed segments of the plastic patch.*

2. [A combination as set forth in claim 1 which includes means providing a heating zone to heat the workpieces; and which includes means to convey the workpieces through the heating zone to deliver the workpieces to the processing station.] *The apparatus of claim 1 which includes*

*means providing a heating zone to heat the fasteners,*

*means to convey the fasteners through the heating zone to deliver the heated fasteners to the processing station.*

3. [A combination as set forth in claim 1 which includes driving means to actuate the moving parts of the apparatus through successive operating cycles; and which includes guide means for gravitational movement of the workpieces through said processing station and beyond.] *An apparatus for forming a plastic patch on a workpiece which is an externally threaded fastener to provide the fastener with self-locking characteristics by reason of a patch of plastic adhered to a plurality of unmodified threads of the fastener comprising:*

*means for heating the threaded fastener to an elevated temperature sufficient to convert the plastic patch to a completely molten state when the patch is brought into contact with the heated fastener;*

*means to place the heated fastener in a preselected position at a processing station;*

*means to advance an increment of plastic strip to a position adjacent the heated fastener;*

*means for cutting a fragment from the increment and to carry the fragment to the heated fastener;*

*means having a smooth working face which is shaped to a curvature that is substantially complementary to the curvature of the threaded fastener to press the fragment of plastic strip about the fastener and into engagement with the crests of the threads of the heated fastener;*

*means to yieldingly move said means having a smooth working face against said heated fastener with a force which applies a work shaping pressure to the fragment that is sufficient to hold the fragment engaged with the crests of the threads of the heated fastener without pressurally forcing material of the fragment into the valleys of the threads for a time sufficient for the heated crests of the fastener to sever the fragment into discrete segments which in a completely molten state flow downwardly of the crests and into the valleys between adjacent crests of the threads to adhere to adjacent flanks of the threads in forming a unitary plastic patch on the threads in which accurately predetermined quantities of the plastic are present in each of the discrete severed fragments of the plastic patch;*

*guide means for providing gravitational movement of the workpieces through said processing station and beyond, and*

*driving means to actuate the moving parts of said apparatus through successive operating cycles.*

4. A combination as set forth in claim 3 in which said guide means comprises a chute which has an inclined portion extending downward from a receiving station past the processing station, said chute having a terminal portion which is not downwardly inclined; and which includes means operating in said cycle to discharge the workpieces from the terminal portion of the chute.

[5. A combination as set forth in claim 3 which includes a stop at the processing station to interrupt the gravitational movement of a workpiece and to hold the workpiece in position for processing; and which includes, means operating in said cycle to move the stop between a retracted position and its effective position to interrupt the gravitational movement of a workpiece.] *An apparatus for forming a plastic patch on a workpiece which is a threaded fastener to provide the fastener with self-locking characteristics by reason of a patch of plastic adhered to a plurality of unmodified threads of the fastener comprising:*

*means for heating at least a portion of the workpiece to a temperature in excess of the flow point of the plastic;*

*means to place the workpiece in a preselected position at a processing station including guide means for gravitational movement of a workpiece through said processing station and beyond with a stop at the processing station to interrupt the gravitational movement of a workpiece and to hold the workpiece in position for processing with means operating in the cycle of said apparatus to move the stop between a retracted position and its effective position to interrupt the gravitational movement of a workpiece;*

*means to advance an increment of plastic strip to a position adjacent the workpiece;*

*means for cutting a fragment from the increment to carry the fragment to the workpiece;*

*means having a curved working face shaped to a curvature that is substantially complementary to the curvature of the workpiece to press the fragment of plastic strip about the curved surface of the workpiece with work shaping pressure sufficient only to hold the fragment engaged with the crests of the threads of the workpiece and without pressurally forcing material of the fragment into the valleys of the threads for a time sufficient to cause the material of the fragment to melt and in a molten state to flow into each valley of the adjacent threads engaged with said fragment, and*

*driving means to actuate the moving parts of said apparatus through successive operating cycles.*

6. A combination as set forth in claim 5 in which the position of the stop at the processing station is adjustable for cooperation of the stop with workpieces of different sizes.

7. A combination as set forth in claim 6 which includes means operating in said cycle to advance the stop means from its retracted position to its effective position, said advancing means being spring-loaded to permit the stop means to be stopped at selected positions for cooperation with workpieces of different sizes;

and which includes adjustable means to block the advance of the stop means at the selected positions.

8. [A combination as set forth in claim 3 which includes means at a receiving station synchronized with the cycle of operation to release a workpiece to the guide means for movement to the processing station on each cycle;

which includes means to sense the presence or absence of a workpiece at the receiving station;

and which includes means responsive to the sensing means to disable the strip-advancing means temporarily in the absence of a workpiece at the receiving station.] *An apparatus for forming a plastic patch on a workpiece which is a threaded fastener to provide the fastener with self-locking characteristics by reason of a patch of plastic adhered to a plurality of unmodified threads of the fastener comprising:*

*means for heating at least a portion of the workpiece to a temperature in excess of the flow point of the plastic;*

*means to place the workpiece in a preselected position at a processing station which includes guide means for gravitational movement of a workpiece through said processing station and beyond with means at said receiving station synchronized with the cycle of operation of said apparatus to release a workpiece to the guide means for movement of the workpiece to the processing station on each cycle with means to sense the presence or absence of a workpiece at said receiving station;*

*means to advance an increment of plastic strip to a position adjacent the workpiece;*

*means responsive to said sensing means to temporarily disable said means to advance an increment of plastic strip in the absence of a workpiece at said receiving station;*

*means for cutting a fragment from the increment and to carry the fragment to the workpiece;*

*means having a curved working face shaped to a curvature that is substantially complementary to the curvature of the workpiece to press the fragment of plastic strip about the curved surface of the workpiece with work shaping pressure sufficient only to hold the fragment engaged with the crests of the threads of the workpiece and without pressurally forcing material of the fragment into the valleys of the threads for a time sufficient to cause the material of the fragment to melt and in a molten state to flow into each valley of the adjacent threads engaged with said fragment, and*

*driving means to actuate the moving parts of said apparatus through successive operating cycles.*

9. A combination as set forth in claim 8 which includes electrically actuated means to prevent operation of the means to advance an increment of the plastic strip;

and in which said sensing means includes a switch to energize said electrically actuated means.

10. [A combination as set forth in claim 1, including:

a patch-applying assembly that is movable from an upper retracted position to a lower position into contact with the workpiece;

said patch-applying assembly including said means to advance an increment of plastic strip, said means to shear a fragment from the increment of the plastic strip after a strip has been advanced, and said means to press the sheared fragment of plastic against the workpiece after the plastic strip has been sheared off;

a first clamp means positioned at said station, and a second clamp means carried by said patch-applying assembly, with said first and second claim means cooperating to clamp the workpiece when the patch-applying assembly is moved to a lower position and the sheared fragment of plastic strip is pressed against the workpiece.] *An apparatus for forming a plastic patch on a workpiece which is an externally threaded fastener to provide the fastener with self-locking characteristics by reason of a patch of plastic adhered to a plurality of unmodified threads of the fastener comprising:*

*means for heating the threaded fastener to an elevated temperature sufficient to convert the plastic patch to a completely molten state when the patch is brought into contact with the heated fastener;*

*means to place the heated fastener in a preselected position at a processing station;*

*means to advance an increment of plastic strip to a position adjacent the heated fastener;*

*means for cutting a fragment from the increment and to carry the fragment to the heated fastener;*

*means having a smooth working face which is shaped to a curvature that is substantially complementary to the curvature of the threaded fastener to press the fragment of plastic strip about the fastener into engagement with the crests of the threads of the heated fastener;*

*means to yieldingly move said means having a smooth working face against said heated fastener with a force which applies a work shaping pressure to the fragment that is sufficient to hold the fragment engaged with the crests of the threads of the heated fastener without pressurally forcing material of the fragment into the valleys of the threads for a time sufficient for the heated crests of the fastener to sever the fragment into discrete segments which in a completely molten state flow downwardly of the crests and into the valleys between adjacent crests of the threads to adhere to adjacent flanks of the threads in forming a unitary plastic patch on the threads in which accurately predetermined quantities of the plastic are present in each of the discrete severed segments of the plastic patch;*

*a patch-applying assembly including said means for cutting a fragment from an increment of plastic strip after the strip has been advanced and said means to press the fragment of plastic about the fastener after the fragment has been cut from the increment of plastic strip;*

*said patch-applying assembly being movable from an upper retracted position to a lower position into contact with the fastener;*

*a first clamp means positioned at said processing station, and*

*a second clamp means carried by said patch-applying assembly, with said first and second clamp means cooperating to clamp the fastener when the patch-applying assembly is moved to a lowered position and the fragment of plastic strip is pressed about the fastener.*

11. A combination as set forth in claim 10 in which said means to [shear] *cut* the increment comprises a pair of cutting edges, one of the cutting edges being on said second clamp means.

12. A combination as set forth in claim 10 in which said assembly comprises:

a reciprocative plunger;

a head slidingly mounted on the plunger and movable relative thereto between a position extending beyond the plunger and a retracted position, said plunger being said pressing means;

spring means acting between the plunger and the head to urge the head to its relative extended position, said second clamp means being on the leading end of the head to contact the workpiece before the plunger makes contact with the workpiece when the assembly advances, said plunger and head respectively having cutting edges cooperative to [shear] *cut* said strip in response to retraction of the head relative to the plunger by impingement of the head against the workpiece.

13. A combination as set forth in claim 12 which includes actuating means to reciprocate the plunger, said actuating means including spring means to yield when the plunger contacts the workpiece and to cause the plunger to exert pressure against the workpiece after the plunger contacts the workpiece.

14. A combination as set forth in claim 13 which includes mechanism carried by the head to advance the increment of the plastic strip, said mechanism being actuated by advance of the head towards the workpiece.

15. A combination as set forth in claim 14 which includes a rack and a cooperating pinion to actuate said mechanism, the rack being stationary adjacent the path of reciprocation of the head, the pinion being carried by the head for rotation by the rack means and being connected to the mechanism for actuation thereof.

16. A combination as set forth in claim 15 in which the rack is adjustable longitudinally of the path of advance of the head to adjust the length of said increment of the plastic strip.

17. The combination as set forth in claim 15 which includes means to retract the rack out of the path of the pinion to prevent operation of the mechanism in the absence of a workpiece at said station.

18. A combination as set forth in claim 17 which includes solenoid means to retract the rack in the absence of a workpiece at said station.

19. A combination as set forth in claim 17 which includes means responsive to the absence of a workpiece at said station; and in which said retracting means is responsive to the responsive means.

20. In an apparatus for forming a plastic patch on a workpiece, for example on the screw thread of a fastener, the combination of:

*means for heating the workpiece to a temperature in excess of the flow point of the plastic;* means to support successive workpieces in reclining position at a processing station;

a plunger above the processing station;

means to reciprocate the plunger between an upper retracted position and a lower advanced position in contact with a workpiece at said processing station;

a head mounted on the leading end of the plunger to contact a workpiece at the processing station and movable relative to the plunger between a retracted position and a position extending beyond the leading end of the plunger;

yielding means effective between the head and the plunger to urge the head to its advanced position relative to the plunger;

means carried by the head to advance an increment of plastic strip in response to reciprocation of the head with the plunger;

cutting edges on the plunger and head respectively cooperative to cut off the advanced increment of the plastic strip in response to retraction of the head relative to the plunger by impingement of the head against a workpiece, whereby the advance of the plunger causes in sequence:

advance of an increment of the plastic strip;

abutment of the head against a workpiece;

advance of the plunger towards the workpiece after the head contacts the workpiece with consequent pressing of the head against the workpiece by yielding means;

continued advance of the plunger to cooperate with the head to sever the advanced increment of the plastic strip; and continued advance of the plunger to press the severed plastic strip against the workpiece *with work shaping pressure sufficient only to hold the severed plastic strip engaged with the crests of the threads of the workpiece and without pressurally forcing the material of the fragment into the valleys of the threads for time sufficient to cause the material of the fragment to melt and in a molten state to flow into each valley of the adjacent threads engaged with said fragment.*

21. A combination as set forth in claim 20 in which the workpiece is curved in cross-sectional configuration and in which the leading end of the plunger is curved in accord with the cross-sectional concurvature of the workpiece.

22. A combination as set forth in claim 20 in which the means to reciprocate the plunger includes a yielding operating connection to the plunger to permit the plunger to be stopped by contact with the workpiece and to cause the plunger to exert pressure against the workpiece after the workpiece stops the plunger.

23. A combination as set forth in claim 20 in which the workpieces are heated and in which said head is water cooled to prevent excessive heating of the head by the heated workpieces.

24. A combination as set forth in claim 20 in which said means to advance an increment of the plastic strip comprises a rack and a pinion for rotation by the rack, the rack being positioned adjacent the path of movement of the head and the pinion being carried by the head, the pinion being operatively connected to the means for advancing an increment of the plastic strip.

25. [A combination as set forth in claim 24 which includes means operative to retract the rack out of the path of the pinion to prevent advance of an increment of the plastic strip in the absence of a workpiece at the processing station.] *In an apparatus for forming a plastic patch on a workpiece, for example on the screw thread of a fastener, the combination of:*

*means for heating the workpiece to a temperature in excess of the flow point of the plastic;*

*means to support successive workpieces in reclining position at a processing station;*

*a plunger above the processing station;*

*means to reciprocate the plunger between an upper retracted position and a lower advanced position in contact with a workpiece at said processing station;*

*a head mounted on the leading end of the plunger to contact a workpiece at the processing station and movable relative to the plunger between a retracted position and a position extending beyond the leading end of the plunger;*

*yielding means effective between the head and the plunger to urge the head to its extended position relative to the plunger;*

*means carried by the head to advance an increment of plastic strip in response to reciprocation of the head with the plunger which includes a rack and a pinion rotated by the rack with the rack being positioned adjacent the path of movement of the head and the pinion carried by the head and the pinion operatively connected to the means for advancing an increment of the plastic strip;*

*means operative to retract the rack out of the path of the pinion to prevent advance of an increment of the plastic strip in the absence of a workpiece at the processing station;*

*cutting edges on the plunger and the head respectively cooperative to cut off the advanced increment of the plastic strip in response to retraction of the head relative to the plunger by impingement of the head against a workpiece,*

*whereby the advance of the plunger causes in sequence:*

*advance of an increment of the plastic strip;*

*abutment of the head against a workpiece;*

*advance of the plunger towards the workpiece after the head contacts the workpiece with consequent pressing of the head against the workpiece by said yielding means;*

*continued advance of the plunger to cooperate with the head to sever the advanced increment of the plastic strip, and*

*continued advance of the plunger to press the severed plastic strip against the workpiece with work shaping pressure sufficient only to hold the severed plastic strip engaged with the crests of the threads of the workpiece and without pressurally forcing the material of the fragment into the valleys of the threads for a time sufficient to cause the material of the fragment to melt and in a molten state to flow into each valley of the adjacent threads engaged with said fragment.*

26. A combination as set forth in claim 25 in which the rack is adjustable along the path of movement of the head to adjust the extent to which the pinion is actuated by the rack thereby to adjust the length of said increment of the plastic strip.

[27. An apparatus for forming a threaded fastener having self-locking characteristics by reason of a patch of plastic adhered to a plurality of unmodified threads of the fastener comprising:

means for heating a threaded fastener to a temperature in excess of the flow point of the plastic;

means for transferring the heated fastener to a work station on said apparatus;

means for feeding a flat ribbon of a preselected thickness of the plastic to said work station;

means at said work station for cutting a fragment of a predetermined length from said ribbon with said fragment having a width substantially less than the circumference of the major diameter of the threads of the fastener;

means at said work station for placing and holding the fragment of the flat ribbon of the plastic on the heated fastener at a preselected location thereon and for pressurally shaping the said fragment to the circumference of the major diameter of the threads with sufficient work shaping pressure to hold said fragment about the circumference of the major diameter of the threads and against longitudinal and radial movement relative to the said threads for a time sufficient to cause the heated crests of the threads engaged with said fragment to sever the fragment into discrete segments whereby accurately predetermined quantities of the plastic formed by the discrete segments melt and flow downwardly of the crests and into the valleys between adjacent crests of the threads to adhere to adjacent flanks of the threads to form a unitary coadhesive patch of the plastic at the said preselected location thereon; and means for transferring said fastener with the plastic adhered to the threads of the same from said work station.]

[28. An apparatus for forming a threaded fastener having self-locking characteristics by reason of a patch of polyester adhered to a preselected plurality of unmodified threads of the fastener comprising:

means at one work station on said apparatus for heating a threaded fastener to a temperature in excess of the flow point temperature of the polyester;

means for transferring said heated fastener to a second work station on said apparatus;

means for advancing a flat ribbon of a preselected thickness of the plastic polyester to said second work station;

means at said second work station for cutting a fragment of a predetermined length from said ribbon with the fragment having a width substantially less than the circumference of the major diameter of the threads of the fastener, including means for pressurally engaging said fragment with the heated fastener at a preselected location thereon and for simultaneously pressurally shaping the said fragment to the circumference of the major diameter of the threads with sufficient work shaping pressure to hold said fragment against longitudinal and radial movement relative to said threads for a time sufficient to cause an amount of the polyester determined by the longitudinal extent of the fragment between adjacent crests of the threads to melt and flow into each valley of adjacent threads engaged with said fragment and outwardly of the same to form a unitary coadhesive patch of the polyester adhered to the threads of the fastener at the preselected location thereon;

means for transferring said fastener from said second work station to a third work station; and means at said third work station for abruptly cooling the fastener to solidify the polyester adhered to the threads thereof.]

*29. The apparatus of claim 1, including:*

*a patch-applying assembly that is movable from an upper retracted position to a lower position into contact with the workpiece, and*

*said patch-applying assembly including said means to cut a fragment from the increment of plastic strip after the strip has been advanced, and said means to press the fragment of plastic material about the workpiece after the fragment has been cut from the plastic strip.*

*30. The apparatus of claim 29 wherein*

*said patch-applying assembly includes said means to advance an increment of plastic strip, and*

*said means to advance an increment of plastic strip is actuated by movement of said patch-applying assembly.*

*31. The apparatus of claim 1 in which said means to cut said fragment includes*

*a pair of cutting edges for cutting said fragment;*

*one of said cutting edges being on said means having a curved working face, and*

*said means having a curved working face then carrying said fragment to said workpiece, and thereafter pressing said fragment about the curved heated surface of said workpiece.*

*32. An apparatus for forming a plastic patch on a workpiece which is an externally threaded fastener to provide the fastener with self-locking characteristics by reason of a patch of plastic adhered to a plurality of unmodified threads of the fastener comprising:*

*means for heating the threaded fastener to an elevated temperature sufficient to convert the plastic patch to a completely molten state when the patch is brought into contact with the heated fastener;*

*means to place the heated fastener in a preselected position at a processing station;*

*means to advance an increment of plastic strip to a position adjacent the heated fastener;*

*means for cutting a fragment from the increment and to carry the fragment to the heated fastener;*

*means having a smooth working face which is shaped to a curvature that is substantially complementary to the curvature of the threaded fastener to press the fragment of plastic strip about the fastener and into engagement with the crests of the threads of the heated fastener;*

*means to yieldingly move said means having a smooth working face against said heated fastener with a force which applies a work shaping pressure to the fragment that is sufficient to hold the fragment engaged with the crests of the threads of the heated fastener without pressurally forcing material of the fragment into the valleys of the threads for a time sufficient for the heated crests of the fastener to sever the fragment into discrete segments which in a completely molten state flow downwardly of the crests and into the valleys between adjacent crests of the threads to adhere to adjacent flanks of the threads in forming a unitary plastic patch on the threads in which accurately predetermined quantities of the plastic are present in each of the discrete severed segments of the plastic patch;*

*a patch-applying assembly that is movable from an upper retracted position to a lower position into contact with the fastener;*

*said patch-applying assembly including said means to cut a fragment from the increment of plastic strip after the strip has been advanced and said means to press the fragment of plastic material about the workpiece after the fragment has been cut from the plastic strip;*

*said means to press the fragment of plastic material about the workpiece including a reciprocative plunger in said assembly;*

*actuating means to move said assembly and said plunger toward said fastener;*

*stop means to interrupt the movement of said assembly when it approaches said fastener, and*

*said plunger then continuing its movement to press said fragment about said fastener.*

*33. The apparatus of claim 32 wherein*

*said patch-applying assembly includes said means to advance an increment of plastic strip, and*

*said means to advance an increment of plastic strip is actuated by movement of said patch-applying assembly.*

*34. The apparatus of claim 1 including:*

*a single drive means, and*

*means interconnecting said drive means with the moving parts of said apparatus to actuate the moving parts of the apparatus through successive operating cycles.*

*35. The apparatus of claim 20 including:*

*a single drive means, and*

*means interconnecting said drive means with the moving parts of said apparatus to actuate the moving parts of the apparatus through successive operating cycles.*

* * * * *